United States Patent
Chen et al.

(10) Patent No.: US 8,154,528 B2
(45) Date of Patent: Apr. 10, 2012

(54) MATRIX SENSING APPARATUS

(75) Inventors: Wu-Min Chen, Hsin-Chu (TW);
Chih-Lin Liao, Hsin-Chu (TW);
Hung-Min Shih, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 702 days.

(21) Appl. No.: 12/365,153

(22) Filed: Feb. 3, 2009

(65) Prior Publication Data

US 2010/0045631 A1 Feb. 25, 2010

(30) Foreign Application Priority Data

Aug. 21, 2008 (TW) .............................. 97131890 A

(51) Int. Cl.
*G06F 3/041* (2006.01)
(52) U.S. Cl. ........ 345/173; 345/174; 345/175; 345/104; 178/18.01; 178/18.06; 178/18.09
(58) Field of Classification Search .................... 345/104
See application file for complete search history.

(56) References Cited

U.S. PATENT DOCUMENTS

| | | | | |
|---|---|---|---|---|
| 5,204,661 A | * | 4/1993 | Hack et al. | 345/88 |
| 6,825,822 B2 | * | 11/2004 | Lee | 345/87 |
| 6,914,595 B1 | * | 7/2005 | Kobayashi et al. | 345/179 |
| 7,352,349 B2 | * | 4/2008 | Baek et al. | 345/92 |
| 7,773,068 B2 | * | 8/2010 | Nakamura et al. | 345/104 |
| 7,884,810 B2 | * | 2/2011 | Jang et al. | 345/174 |
| 7,948,470 B2 | * | 5/2011 | Tsou et al. | 345/103 |
| 2002/0054003 A1 | * | 5/2002 | Kodate | 345/87 |
| 2008/0192001 A1 | * | 8/2008 | Choi et al. | 345/104 |

FOREIGN PATENT DOCUMENTS

TW 200832335 8/2008

* cited by examiner

*Primary Examiner* — Richard Hjerpe
*Assistant Examiner* — Christopher Thompson
(74) *Attorney, Agent, or Firm* — Winston Hsu; Scott Margo

(57) ABSTRACT

A matrix sensing apparatus with architecture having reduced quantity of required sensing lines is disclosed. The matrix sensing apparatus includes a plurality of driving lines, a plurality of sensing lines and a matrix sensing region. The matrix sensing region includes a plurality of sensing areas. Each sensing area includes a first transistor, a second transistor, and a sensing unit for generating a sensing signal. The first transistor is coupled to the sensing unit and a corresponding sensing line. The second transistor is coupled to the first transistor, a first corresponding driving line and a second corresponding driving line. The first transistor together with the second transistor functions to control the signal connection between the sensing unit and the corresponding sensing line based on the driving signals of the first and second corresponding driving lines.

20 Claims, 4 Drawing Sheets

MATRIX SENSING APPARATUS

BACKGROUND OF THE INVENTION

1. Field of the Invention

The present invention relates to a matrix sensing apparatus, and more particularly, to a matrix sensing apparatus with architecture having reduced quantity of required sensing lines.

2. Description of the Prior Art

Because liquid crystal display (LCD) devices are characterized by thin appearance, low power consumption, and low radiation, LCD devices have been widely applied in various electronic products such as multimedia playbacks, mobile phones, personal digital assistants (PDAs), computer monitors, or flat panel televisions. Furthermore, the LCD device having touch panel as input interface for a user to interact with the electronic product has gained popularity. That is, the LCD touch panel is applied to more and more electronic appliances for providing a friendly interface. In general, the LCD touch panels are primarily classified into the resistive touch panels and the capacitive touch panels. The resistive touch panel positions a touched position according to related voltage drops changing in response to the touched position. The capacitive touch panel normally comprises a plurality of sensing capacitors, and the touched position can be positioned by analyzing the changing of capacitance of the sensing capacitor corresponding to the touched position.

FIG. 1 is a structural diagram schematically showing a prior-art matrix sensing apparatus for use in an LCD touch panel. As shown in FIG. 1, the matrix sensing apparatus 100 comprises a driving circuit 110, an analog multiplex unit 120, an analog-to-digital conversion unit 130, a micro-controller unit 140, a plurality of driving lines 115, a plurality of sensing lines 125, and a matrix sensing region 190. The matrix sensing region 190 comprises a plurality of sensing areas 150. Each sensing area 150 comprises a sensing unit 151 and a readout transistor 153. The readout transistor 153 is employed to control the output of sensing signals generated by the sensing unit 151 based on a driving signal furnished to the gate of the readout transistor 153 via a corresponding driving line 115. As shown in FIG. 1, each sensing line 125 is coupled to only one column of sensing units for outputting the sensing signals generated. In other words, there is one dedicated sensing line 125 disposed for each column of sensing units. Consequently, a tremendous amount of the sensing lines 125 is required for outputting sensing signals in the matrix sensing apparatus 100, which leads to high circuit layout complexity and makes a negative factor for achieving low-cost and high-resolution panel displays.

SUMMARY OF THE INVENTION

In accordance with an embodiment of the present invention, a matrix sensing apparatus with architecture having reduced quantity of required sensing lines is disclosed. The matrix sensing apparatus comprises a plurality of driving lines, a plurality of sensing lines, and a matrix sensing region.

The driving lines are utilized for receiving a plurality of driving signals. The sensing lines are utilized for outputting a plurality of sensing signals. The matrix sensing region comprises a plurality of sensing areas. Each of the sensing areas comprises a sensing unit, a first transistor, and a second transistor. The sensing unit is utilized for generating a corresponding sensing signal. The first transistor comprises a first end coupled to the sensing unit for receiving the corresponding sensing signal, a second end coupled to a corresponding sensing line, and a gate. The second transistor comprises a first end coupled to the gate of the first transistor, a gate coupled to a first driving line for receiving a first driving signal, and a second end coupled to a second driving line for receiving a second driving signal. The first transistor together with the second transistor controls a signal connection between the sensing unit and the corresponding sensing line based on the first and second driving signals.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
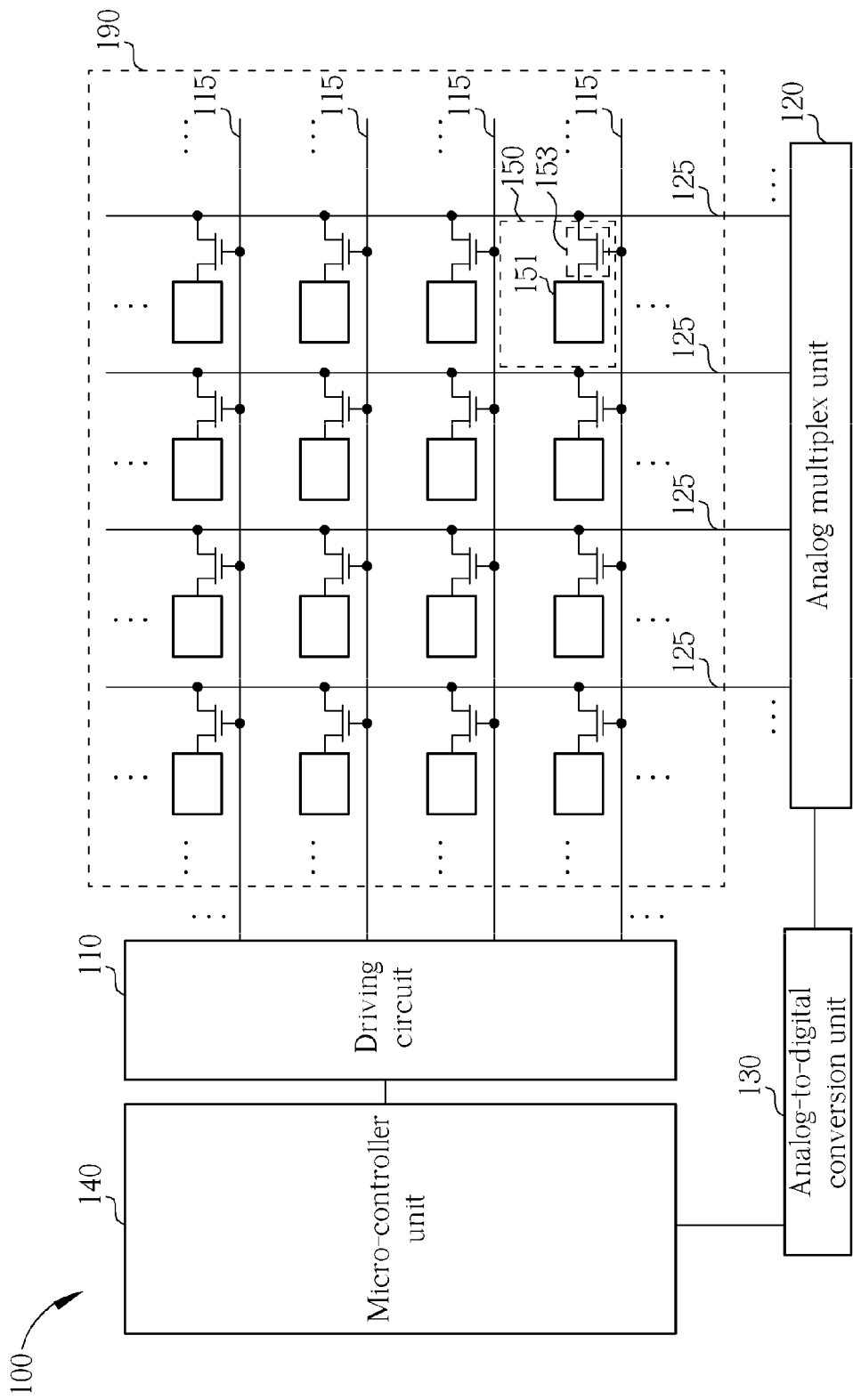
FIG. 1 is a structural diagram schematically showing a prior-art matrix sensing apparatus for use in an LCD touch panel.
Figure 2:
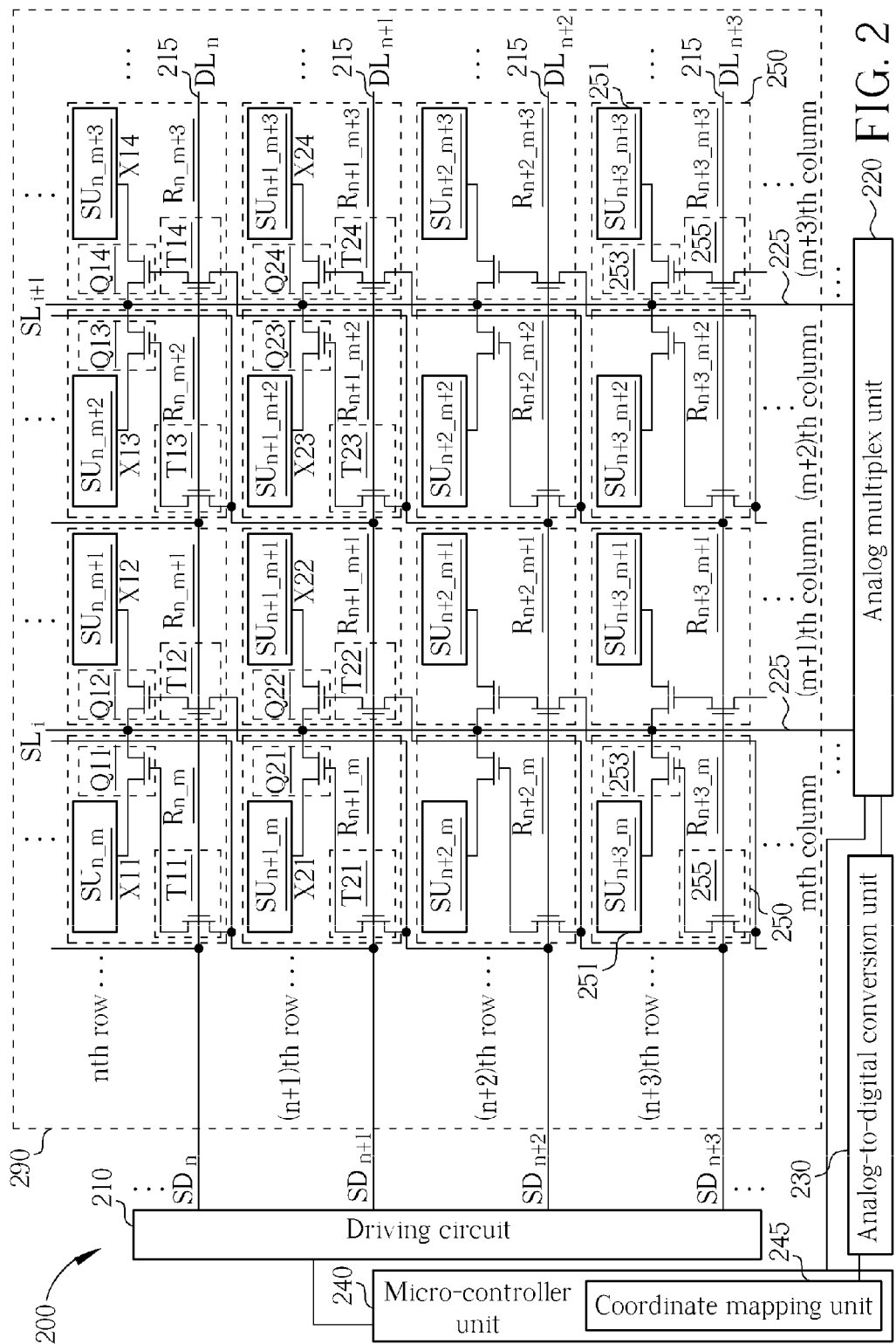
FIG. 2 is a structural diagram schematically showing a matrix sensing apparatus in accordance with a preferred embodiment of the present invention.

FIG. 2 is a structural diagram schematically showing a matrix sensing apparatus in accordance with a preferred embodiment of the present invention. As shown in FIG. 2, the matrix sensing apparatus 200 comprises a driving circuit 210, an analog multiplex unit 220, an analog-to-digital conversion unit 230, a micro-controller unit 240, a plurality of driving lines 215, a plurality of sensing lines 225, and a matrix sensing region 290. The matrix sensing region 290 comprises a plurality of sensing areas 250. Each sensing area 250 comprises a sensing unit 251, a first transistor 253, and a second transistor 255. The micro-controller unit 240 comprises a coordinate mapping unit 245. In another embodiment, the coordinate mapping unit 245 is disposed between the micro-controller unit 240 and the analog-to-digital conversion unit 230 instead of being embedded in the micro-controller unit 240.

Each sensing unit 251 comprises a pressure sensing device or a light sensing device. The pressure sensing device is a capacitive pressure sensing device or a piezoelectric device. The light sensing device is a photo-diode or a photo-transistor. The first transistor 253 and the second transistor 255 are metal oxide semiconductor (MOS) field effect transistors or thin film transistors.

The driving circuit 210 is coupled to the micro-controller unit 240 for receiving a control signal and functions to generate a plurality of driving signals based on the control signal. The plurality of driving lines 215 are coupled to the driving circuit 210 for receiving the plurality of driving signals. Each sensing unit 251 generates a sensing signal in response to a touch event, and the sensing signal is furnished to a corresponding sensing line 225 via a corresponding first transistor 253. The analog multiplex unit 220 is coupled to the plurality of sensing lines 225 for receiving a plurality of sensing signals. The analog multiplex unit 220 is further coupled to the micro-controller unit 240 for receiving a selection signal. Based on the selection signal, the analog multiplex unit 220 outputs an analog multiplex signal by performing a selection operation over the sensing signals. The analog-to-digital conversion unit 230 is coupled to the analog multiplex unit 220 and functions to convert the analog multiplex signal into a digital multiplex signal. The coordinate mapping unit 245 is coupled to the analog-to-digital conversion unit 230 and functions to map the digital multiplex signal to a corresponding coordinate signal.

As shown in FIG. 2, for ease of explanation, the matrix sensing apparatus 200 illustrates four driving lines DLn-DLn+3, two sensing lines SLi-SLi+1, and a plurality of sensing areas Rn_m-Rn+3_m+3. The driving lines DLn-DLn+3 are employed to deliver the driving signals SDn-SDn+3 generated by the driving circuit 210. The sensing line SLi is coupled to the mth column of sensing areas Rn_m-Rn+3_m and the (m+1) column of sensing areas Rn_m+1-Rn+3_m+1. The sensing line SLi+1 is coupled to the (m+2)th column of sensing areas Rn_m+2-Rn+3_m+2 and the (m+3) column of sensing areas Rn_m+3-Rn+3_m+3. The coupling relations regarding some exemplary sensing areas 250 are detailed as the followings.

The mth sensing area Rn_m of the nth row comprises a sensing unit SUn_m, a first transistor Q11 and a second transistor T11. The first transistor Q11 comprises a first end coupled to the sensing unit SUn_m, a second end coupled to the sensing line SLi, and a gate. The second transistor T11 comprises a first end coupled to the gate of the first transistor Q11, a gate coupled to the driving line DLn, and a second end coupled to the driving line DLn+1. The first transistor Q11 together with the second transistor T11 controls a signal connection between the sensing unit SUn_m and the sensing line SLi based on the driving signals SDn, SDn+1 of the driving lines DLn, DLn+1. The (m+1)th sensing area Rn_m+1 of the nth row comprises a sensing unit SUn_m+1, a first transistor Q12 and a second transistor T12. The first transistor Q12 comprises a first end coupled to the sensing unit SUn_m+1, a second end coupled to the sensing line SLi, and a gate. The second transistor T12 comprises a first end coupled to the gate of the first transistor Q12, a gate coupled to the driving line DLn, and a second end coupled to the driving line DLn+2. The first transistor Q12 together with the second transistor T12 controls a signal connection between the sensing unit SUn_m+1 and the sensing line SLi based on the driving signals SDn, SDn+2 of the driving lines DLn, DLn+2.

The (m+2)th sensing area Rn_m+2 of the nth row comprises a sensing unit SUn_m+2, a first transistor Q13 and a second transistor T13. The first transistor Q13 comprises a first end coupled to the sensing unit SUn_m+2, a second end coupled to the sensing line SLi+1, and a gate. The second transistor T13 comprises a first end coupled to the gate of the first transistor Q13, a gate coupled to the driving line DLn, and a second end coupled to the driving line DLn+1. The first transistor Q13 together with the second transistor T13 controls a signal connection between the sensing unit SUn_m+2 and the sensing line SLi+1 based on the driving signals SDn, SDn+1 of the driving lines DLn, DLn+1. The (m+3)th sensing area Rn_m+3 of the nth row comprises a sensing unit SUn_m+3, a first transistor Q14 and a second transistor T14. The first transistor Q14 comprises a first end coupled to the sensing unit SUn_m+3, a second end coupled to the sensing line SLi+1, and a gate. The second transistor T14 comprises a first end coupled to the gate of the first transistor Q14, a gate coupled to the driving line DLn, and a second end coupled to the driving line DLn+2. The first transistor Q14 together with the second transistor T14 controls a signal connection between the sensing unit SUn_m+3 and the sensing line SLi+1 based on the driving signals SDn, SDn+2 of the driving lines DLn, DLn+2.

The mth sensing area Rn+1_m of the (n+1)th row comprises a sensing unit SUn+1_m, a first transistor Q21 and a second transistor T21. The first transistor Q21 comprises a first end coupled to the sensing unit SUn+1_m, a second end coupled to the sensing line SLi, and a gate. The second transistor T21 comprises a first end coupled to the gate of the first transistor Q21, a gate coupled to the driving line DLn+1, and a second end coupled to the driving line DLn+2. The first transistor Q21 together with the second transistor T21 controls a signal connection between the sensing unit SUn+1_m and the sensing line SLi based on the driving signals SDn+1, SDn+2 of the driving lines DLn+1, DLn+2. The (m+1)th sensing area Rn+1_m+1 of the (n+1)th row comprises a sensing unit SUn+1_m+1, a first transistor Q22 and a second transistor T22. The first transistor Q22 comprises a first end coupled to the sensing unit SUn+1_m+1, a second end coupled to the sensing line SLi, and a gate. The second transistor T22 comprises a first end coupled to the gate of the first transistor Q22, a gate coupled to the driving line DLn+1, and a second end coupled to the driving line DLn+3. The first transistor Q22 together with the second transistor T22 controls a signal connection between the sensing unit SUn+1_m+1 and the sensing line SLi based on the driving signals SDn+1, SDn+3 of the driving lines DLn+1, DLn+3.

The (m+2)th sensing area Rn+1_m+2 of the (n+1)th row comprises a sensing unit SUn+1_m+2, a first transistor Q23 and a second transistor T23. The first transistor Q23 comprises a first end coupled to the sensing unit SUn+1_m+2, a second end coupled to the sensing line SLi+1, and a gate. The second transistor T23 comprises a first end coupled to the gate of the first transistor Q23, a gate coupled to the driving line DLn+1, and a second end coupled to the driving line DLn+2. The first transistor Q23 together with the second transistor T23 controls a signal connection between the sensing unit SUn+1_m+2 and the sensing line SLi+1 based on the driving signals SDn+1, SDn+2 of the driving lines DLn+1, DLn+2. The (m+3)th sensing area Rn+1_m+3 of the (n+1)th row comprises a sensing unit SUn+1_m+3, a first transistor Q24 and a second transistor T24. The first transistor Q24 comprises a first end coupled to the sensing unit SUn+1_m+3, a second end coupled to the sensing line SLi+1, and a gate. The second transistor T24 comprises a first end coupled to the gate of the first transistor Q24, a gate coupled to the driving line DLn+1, and a second end coupled to the driving line DLn+3. The first transistor Q24 together with the second transistor T24 controls a signal connection between the sensing unit SUn+1_m+3 and the sensing line SLi+1 based on the driving signals SDn+1, SDn+3 of the driving lines DLn+1, DLn+3. The coupling relations regarding other sensing areas 250 can be inferred by analogy.

In summary, all the sensing areas 250 of the mth and (m+1)th columns are coupled to the sensing line SLi for outputting corresponding sensing signals, and all the sensing areas 250 of the (m+2)th and (m+3)th columns are coupled to the sensing line SLi+1 for outputting corresponding sensing signals. That is, in the matrix sensing apparatus 200 of the present invention, each sensing line 225 is coupled to two adjacent columns of sensing areas. Compared to the prior-art matrix sensing apparatus 100 having each sensing line 125 coupled to only one column of sensing areas, the quantity of the sensing lines 225 required in the matrix sensing apparatus 200 can be reduced significantly for achieving low-cost and high-resolution panel displays.

Figure 3:
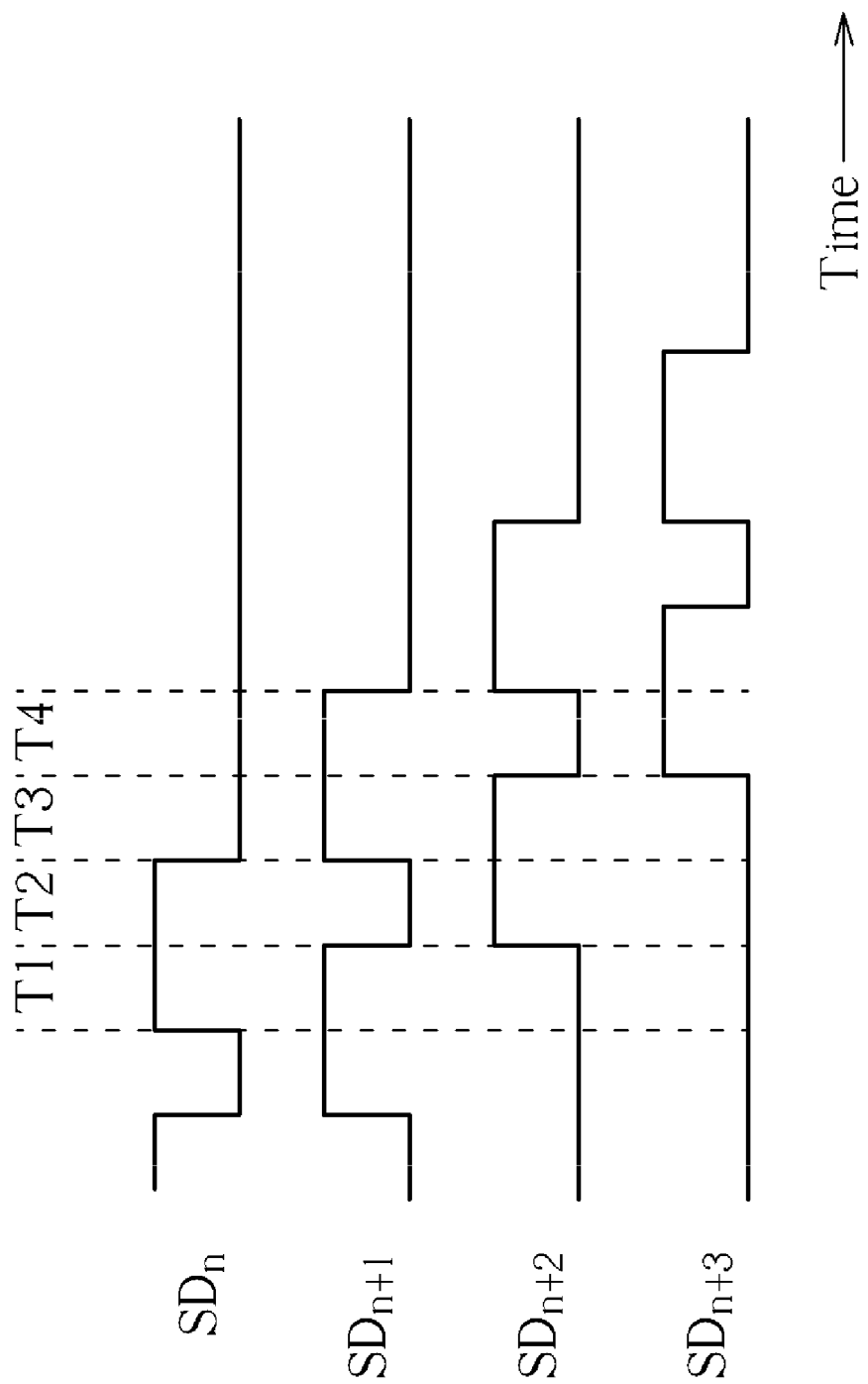
FIG. 3 is a timing diagram schematically showing related driving signals regarding the driving operation of the matrix sensing apparatus in FIG. 2, having time along the abscissa.

FIG. 3 is a timing diagram schematically showing related driving signals regarding the driving operation of the matrix sensing apparatus in FIG. 2, having time along the abscissa. The driving signals in FIG. 3, from top to bottom, are the driving signal SDn, the driving signal SDn+1, the driving signal SDn+2, and the driving signal SDn+3. The driving operation of the matrix sensing apparatus 200 is set forth as the followings based on the timing relationships of the driving signals shown in FIG. 3.

During a first interval T1, the driving signals SDn and SDn+1 are enabled, and the second transistors T11 and T13 are turned on by the enabled driving signal SDn. Then, the enabled driving signal SDn+1 can be furnished to the gates of the first transistors Q11 and Q13 via the second transistors T11 and T13 respectively, and therefore the first transistors Q11 and Q13 are turned on so that the sensing signals X11 and X13 generated by the sensing units SUn_m and SUn_m+2 can be forwarded to the analog multiplex unit 220 via the sensing lines SLi and SLi+1 respectively.

It is noted that although the second transistors T12 and T14 are also enabled during the first interval T1, the first transistors Q12 and Q14 are not turned on due to the fact that the driving signal SDn+2 is not enabled during the first interval T1. Consequently, the sensing signals X12 and X14 generated by the sensing units SUn_m+1 and SUn_m+3 cannot be forwarded to the sensing lines SLi and SLi+1 respectively. In other words, during the first interval T1, the sensing line SLi is dedicated to deliver the sensing signal X11 only, and the sensing line SLi+1 is dedicated to deliver the sensing signal X13 only.

During a second interval T2, the driving signals SDn and SDn+2 are enabled, and the second transistors T12 and T14 are turned on by the enabled driving signal SDn. Then, the enabled driving signal SDn+2 can be furnished to the gates of the first transistors Q12 and Q14 via the second transistors T12 and T14 respectively, and therefore the first transistors Q12 and Q14 are turned on so that the sensing signals X12 and X14 generated by the sensing units SUn_m+1 and SUn_m+3 can be forwarded to the analog multiplex unit 220 via the sensing lines SLi and SLi+1 respectively.

Similarly, although the second transistors T11 and T13 are also enabled during the second interval T2, the first transistors Q11 and Q13 are not turned on due to the fact that the driving signal SDn+1 is not enabled during the second interval T2. Consequently, the sensing signals X11 and X13 generated by the sensing units SUn_m and SUn_m+2 cannot be forwarded to the sensing lines SLi and SLi+1 respectively. In other words, during the second interval T2, the sensing line SLi is dedicated to deliver the sensing signal X12 only, and the sensing line SLi+1 is dedicated to deliver the sensing signal X14 only.

During a third interval T3, the driving signals SDn+1 and SDn+2 are enabled, and the second transistors T21 and T23 are turned on by the enabled driving signal SDn+1. Then, the enabled driving signal SDn+2 can be furnished to the gates of the first transistors Q21 and Q23 via the second transistors T21 and T23 respectively, and therefore the first transistors Q21 and Q23 are turned on so that the sensing signals X21 and X23 generated by the sensing units SUn+1_m and SUn+1_m+2 can be forwarded to the analog multiplex unit 220 via the sensing lines SLi and SLi+1 respectively.

During a fourth interval T4, the driving signals SDn+1 and SDn+3 are enabled, and the second transistors T22 and T24 are turned on by the enabled driving signal SDn+1. Then, the enabled driving signal SDn+3 can be furnished to the gates of the first transistors Q22 and Q24 via the second transistors T22 and T24 respectively, and therefore the first transistors Q22 and Q24 are turned on so that the sensing signals X22 and X24 generated by the sensing units SUn+1_m+1 and SUn+1_m+3 can be forwarded to the analog multiplex unit 220 via the sensing lines SLi and SLi+1 respectively.

Figure 4:
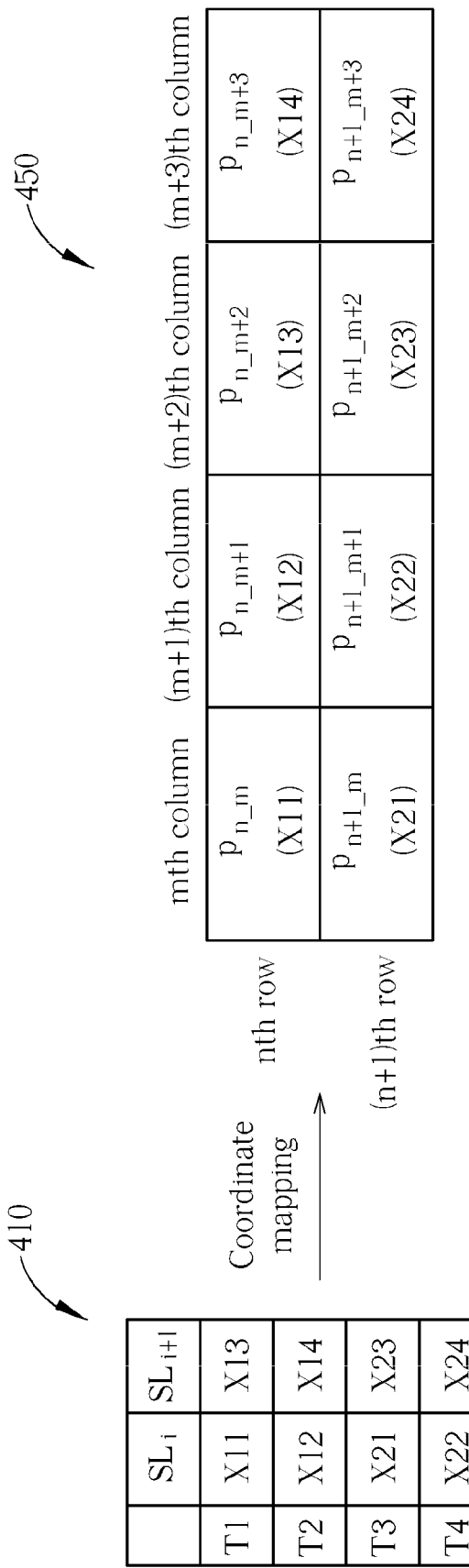
FIG. 4 is a schematic diagram showing a coordinate mapping operation regarding the coordinate mapping unit in FIG. 2.

FIG. 4 is a schematic diagram showing a coordinate mapping operation regarding the coordinate mapping unit in FIG. 2. Referring to FIG. 4, a first table 410 and a second table 450 are illustrated for depicting how to map the sensing signals outputted during different intervals to corresponding sensing coordinate positions. The first table 410 presents a list of sensing signals outputted from the sensing lines SLi and SLi+1 regarding the driving operation of the matrix sensing apparatus 200 based on the driving signals in FIG. 3 from the first interval T1 to the fourth interval T4. As shown in the first table 410, the sensing signals X11 and X13 are outputted from the sensing lines SLi and SLi+1 respectively during the first interval T1, the sensing signals X12 and X14 are outputted from the sensing lines SLi and SLi+1 respectively during the second interval T2, the sensing signals X21 and X23 are outputted from the sensing lines SLi and SLi+1 respectively during the third interval T3, and the sensing signals X22 and X24 are outputted from the sensing lines SLi and SLi+1 respectively during the fourth interval T4.

After the coordinate mapping operation of the coordinate mapping unit 245, the sensing signals X11-X14, outputted from the first interval T1 to the fourth interval T4, are then mapped to the corresponding coordinate positions of the second table 450. For instance, the sensing signals X11 and X13, outputted during the first interval T1, are mapped to the coordinate positions Pn_m and Pn_m+2 of the second table 450. The sensing signals X12 and X14, outputted during the second interval T2, are mapped to the coordinate positions Pn_m+1 and Pn_m+3 of the second table 450. The sensing signals X21 and X23, outputted during the third interval T3, are mapped to the coordinate positions Pn+1_m and Pn+1_m+2 of the second table 450. The sensing signals X22 and X24, outputted during the fourth interval T4, are mapped to the coordinate positions Pn+1_m+1 and Pn+1_m+3 of the second table 450. Please continue referring to FIGS. 4 and 2, the coordinate positions Pn_m-Pn+1_m+3 of the second table 450 shown in FIG. 4 are corresponding directly to the relative positions of the sensing areas Rn_m-Rn+1_m+3 shown in FIG. 2. That is, the coordinate mapping unit 245 functions to locate the touch position by mapping the sensing signals outputted during different intervals to corresponding coordinate positions.

To sum up, regarding the matrix sensing apparatus of the present invention, each sensing line is coupled to two adjacent columns of sensing areas so that the quantity of required sensing lines can be reduced significantly, and the coordinate mapping unit is employed to locate the touch position by mapping the sensing signals outputted from the sensing lines to corresponding coordinate positions based on the coupling architecture of the sensing lines. Consequently, the disclosed matrix sensing apparatus with architecture having reduced quantity of required sensing lines can be applied particularly to achieve low-cost and high-resolution panel displays.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A matrix sensing apparatus comprising:
a plurality of driving lines for receiving a plurality of driving signals;
a plurality of sensing lines for outputting a plurality of sensing signals; and
a matrix sensing region comprising a plurality of sensing areas, each of the sensing areas comprising:
a sensing unit for generating a corresponding sensing signal of the plurality of sensing signals;
a first transistor comprising a first end electrically coupled to the sensing unit for receiving the corresponding sensing signal, a second end electrically coupled to a corresponding sensing line of the plurality of sensing lines, and a gate; and
a second transistor comprising a first end electrically coupled to the gate of the first transistor, a gate electrically coupled to a first driving line of the plurality of driving lines for receiving a first driving signal of the plurality of driving signals, and a second end electrically coupled to a second driving line of the plurality of driving lines for receiving a second driving signal of the plurality of driving signals;
wherein the first transistor and the second transistor control a signal connection between the sensing unit and the corresponding sensing line based on the first driving signal and the second driving signal.

2. The matrix sensing apparatus of claim 1, further comprising:
a driving circuit electrically coupled to the plurality of driving lines for providing the plurality of driving signals;
an analog multiplex unit electrically coupled to the plurality of sensing lines for receiving the plurality of sensing signals, the analog multiplex unit generating an analog multiplex signal by performing a selection operation over the plurality of sensing signals; and
a micro-controller unit electrically coupled to the driving circuit and the analog multiplex unit.

3. The matrix sensing apparatus of claim 2, further comprising:
an analog-to-digital conversion unit, electrically coupled to the analog multiplex unit, for converting the analog multiplex signal into a digital multiplex signal.

4. The matrix sensing apparatus of claim 3, wherein the micro-controller unit comprises:
a coordinate mapping unit, electrically coupled to the analog-to-digital conversion unit, for mapping the digital multiplex signal to a corresponding coordinate signal.

5. The matrix sensing apparatus of claim 3, further comprising:
a coordinate mapping unit, electrically coupled between the micro-controller unit and the analog-to-digital conversion unit, for mapping the digital multiplex signal to a corresponding coordinate signal.

6. The matrix sensing apparatus of claim 2, wherein the micro-controller unit outputs a control signal to the driving circuit, and the driving circuit provides the plurality of driving signals based on the control signal.

7. The matrix sensing apparatus of claim 2, wherein the micro-controller unit outputs a selection signal to the analog multiplex unit, and the analog multiplex unit generates the analog multiplex signal by selecting a corresponding sensing signal of the plurality of sensing signals based on the selection signal.

8. The matrix sensing apparatus of claim 1, wherein the sensing unit comprises a pressure sensing device or a light sensing device.

9. The matrix sensing apparatus of claim 8, wherein the pressure sensing device is a capacitive pressure sensing device or a piezoelectric device.

10. The matrix sensing apparatus of claim 8, wherein the light sensing device is a photo-diode or a photo-transistor.

11. The matrix sensing apparatus of claim 1, wherein the first transistor is a metal oxide semiconductor (MOS) field effect transistor or a thin film transistor.

12. The matrix sensing apparatus of claim 1, wherein the second transistor is a MOS field effect transistor or a thin film transistor.

13. The matrix sensing apparatus of claim 1, wherein an nth row of sensing areas of the matrix sensing region comprises:
an mth sensing area comprising:
a sensing unit;
a first transistor comprising a first end electrically coupled to the sensing unit in the mth sensing area of the nth row of sensing areas, a second end electrically coupled to an ith sensing line of the plurality of sensing lines, and a gate; and
a second transistor comprising a first end electrically coupled to the gate of the first transistor in the mth sensing area of the nth row of sensing areas, a gate electrically coupled to an nth driving line of the plurality of driving lines, and a second end electrically coupled to a (n+1)th driving line of the plurality of driving lines; and
a (m+1)th sensing area comprising:
a sensing unit;
a first transistor comprising a first end electrically coupled to the sensing unit in the (m+1)th sensing area of the nth row of sensing areas, a second end electrically coupled to the ith sensing line, and a gate; and
a second transistor comprising a first end electrically coupled to the gate of the first transistor in the (m+1)th sensing area of the nth row of sensing areas, a gate electrically coupled to the nth driving line, and a second end electrically coupled to a (n+2)th driving line of the plurality of driving lines.

14. The matrix sensing apparatus of claim 13, wherein:
the first and second transistors in the mth sensing area of the nth row of sensing areas control a signal connection between the sensing unit in the mth sensing area of the nth row of sensing areas and the ith sensing line based on a corresponding driving signal of the nth driving line and a corresponding driving signal of the (n+1)th driving line; and
the first and second transistors in the (m+1)th sensing area of the nth row of sensing areas control a signal connection between the sensing unit in the (m+1)th sensing area of the nth row of sensing areas and the ith sensing line based on the corresponding driving signal of the nth driving line and a corresponding driving signal of the (n+2)th driving line.

15. The matrix sensing apparatus of claim 13, wherein the nth row of sensing areas of the matrix sensing region further comprises:

a (m+2)th sensing area comprising:
  a sensing unit;
  a first transistor comprising a first end electrically coupled to the sensing unit in the (m+2)th sensing area of the nth row of sensing areas, a second end electrically coupled to an (i+1)th sensing line of the plurality of sensing lines, and a gate; and
  a second transistor comprising a first end electrically coupled to the gate of the first transistor in the (m+2)th sensing area of the nth row of sensing areas, a gate electrically coupled to the nth driving line, and a second end electrically coupled to the (n+1)th driving line; and
a (m+3)th sensing area comprising:
  a sensing unit;
  a first transistor comprising a first end electrically coupled to the sensing unit in the (m+3)th sensing area of the nth row of sensing areas, a second end electrically coupled to the (i+1)th sensing line, and a gate; and
  a second transistor comprising a first end electrically coupled to the gate of the first transistor in the (m+3)th sensing area of the nth row of sensing areas, a gate electrically coupled to the nth driving line, and a second end electrically coupled to the (n+2)th driving line.

16. The matrix sensing apparatus of claim 15, wherein:
the first and second transistors in the (m+2)th sensing area of the nth row of sensing areas control a signal connection between the sensing unit in the (m+2)th sensing area of the nth row of sensing areas and the (i+1)th sensing line based on a corresponding driving signal of the nth driving line and a corresponding driving signal of the (n+1)th driving line; and
the first and second transistors in the (m+3)th sensing area of the nth row of sensing areas control a signal connection between the sensing unit in the (m+3)th sensing area of the nth row of sensing areas and the (i+1)th sensing line based on the corresponding driving signal of the nth driving line and a corresponding driving signal of the (n+2)th driving line.

17. The matrix sensing apparatus of claim 15, wherein a (n+1)nth row of sensing areas of the matrix sensing region comprises:
an mth sensing area comprising:
  a sensing unit;
  a first transistor comprising a first end electrically coupled to the sensing unit in the mth sensing area of the (n+1)th row of sensing areas, a second end electrically coupled to the ith sensing line, and a gate; and
  a second transistor comprising a first end electrically coupled to the gate of the first transistor in the mth sensing area of the (n+1)th row of sensing areas, a gate electrically coupled to the (n+1)th driving line, and a second end electrically coupled to the (n+2)th driving line; and
a (m+1)th sensing area comprising:
  a sensing unit;
  a first transistor comprising a first end electrically coupled to the sensing unit in the (m+1)th sensing area of the (n+1)th row of sensing areas, a second end electrically coupled to the ith sensing line, and a gate; and
  a second transistor comprising a first end electrically coupled to the gate of the first transistor in the (m+1)th sensing area of the (n+1)th row of sensing areas, a gate electrically coupled to the (n+1)th driving line, and a second end electrically coupled to a (n+3)th driving line of the plurality of driving lines.

18. The matrix sensing apparatus of claim 17, wherein:
the first and second transistors in the mth sensing area of the (n+1)th row of sensing areas control a signal connection between the sensing unit in the mth sensing area of the (n+1)th row of sensing areas and the ith sensing line based on a corresponding driving signal of the (n+1)th driving line and a corresponding driving signal of the (n+2)th driving line; and
the first and second transistors in the (m+1)th sensing area of the (n+1)th row of sensing areas control a signal connection between the sensing unit in the (m+1)th sensing area of the (n+1)th row of sensing areas and the ith sensing line based on the corresponding driving signal of the (n+1)th driving line and a corresponding driving signal of the (n+3)th driving line.

19. The matrix sensing apparatus of claim 17, wherein the (n+1)th row of sensing areas of the matrix sensing region further comprises:
a (m+2)th sensing area comprising:
  a sensing unit;
  a first transistor comprising a first end electrically coupled to the sensing unit in the (m+2)th sensing area of the (n+1)th row of sensing areas, a second end electrically coupled to the (i+1)th sensing line, and a gate; and
  a second transistor comprising a first end electrically coupled to the gate of the first transistor in the (m+2)th sensing area of the (n+1)th row of sensing areas, a gate electrically coupled to the (n+1)th driving line, and a second end electrically coupled to the (n+2)th driving line; and
a (m+3)th sensing area comprising:
  a sensing unit;
  a first transistor comprising a first end electrically coupled to the sensing unit in the (m+3)th sensing area of the (n+1)th row of sensing areas, a second end electrically coupled to the (i+1)th sensing line, and a gate; and
  a second transistor comprising a first end electrically coupled to the gate of the first transistor in the (m+3)th sensing area of the (n+1)th row of sensing areas, a gate electrically coupled to the (n+1)th driving line, and a second end electrically coupled to the (n+3)th driving line.

20. The matrix sensing apparatus of claim 19, wherein:
the first and second transistors in the (m+2)th sensing area of the (n+1)th row of sensing areas control a signal connection between the sensing unit in the (m+2)th sensing area of the (n+1)th row of sensing areas and the (i+1)th sensing line based on a corresponding driving signal of the (n+1)th driving line and a corresponding driving signal of the (n+2)th driving line; and
the first and second transistors in the (m+3)th sensing area of the (n+1)th row of sensing areas control a signal connection between the sensing unit in the (m+3)th sensing area of the (n+1)th row of sensing areas and the (i+1)th sensing line based on the corresponding driving signal of the (n+1)th driving line and a corresponding driving signal of the (n+3)th driving line.

* * * * *